Oct. 16, 1962  B. F. SMITH  3,058,587
PULLER FOR EXTRUSION APPARATUS
Filed Sept. 23, 1959  4 Sheets-Sheet 1
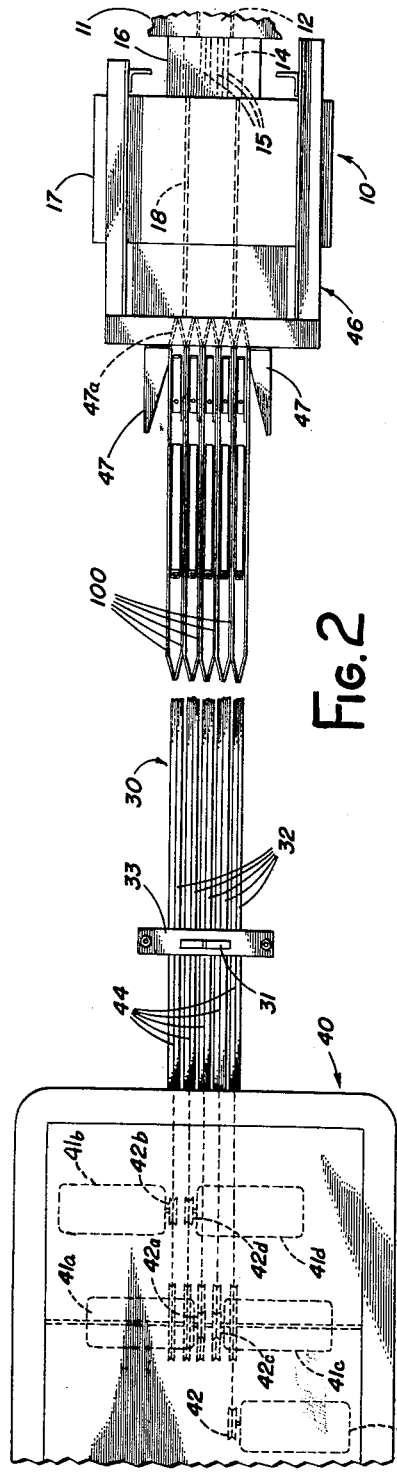
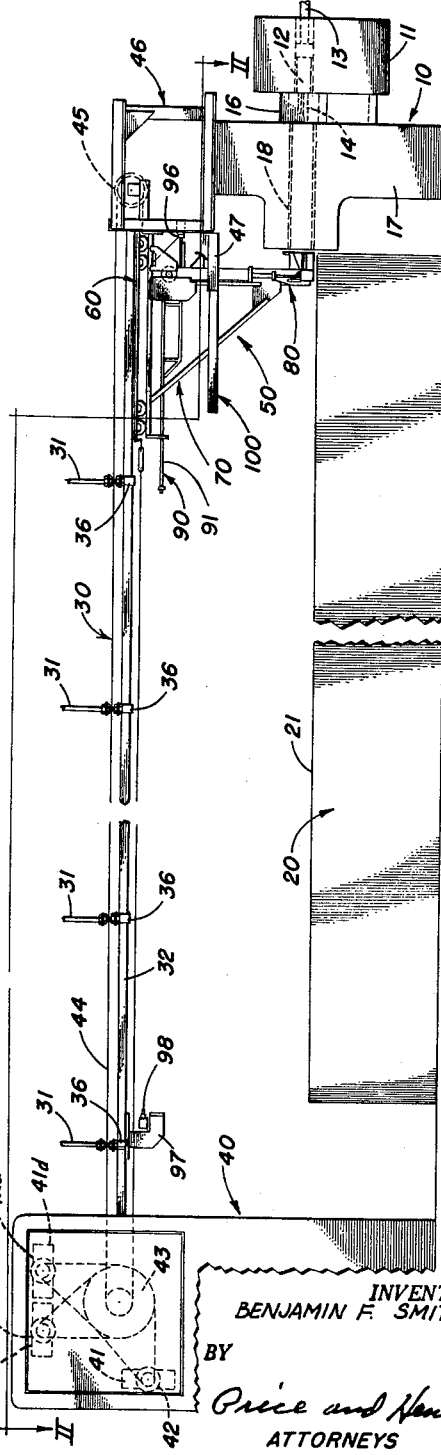
INVENTOR
BENJAMIN F. SMITH
BY
*Price and Heneveld*
ATTORNEYS

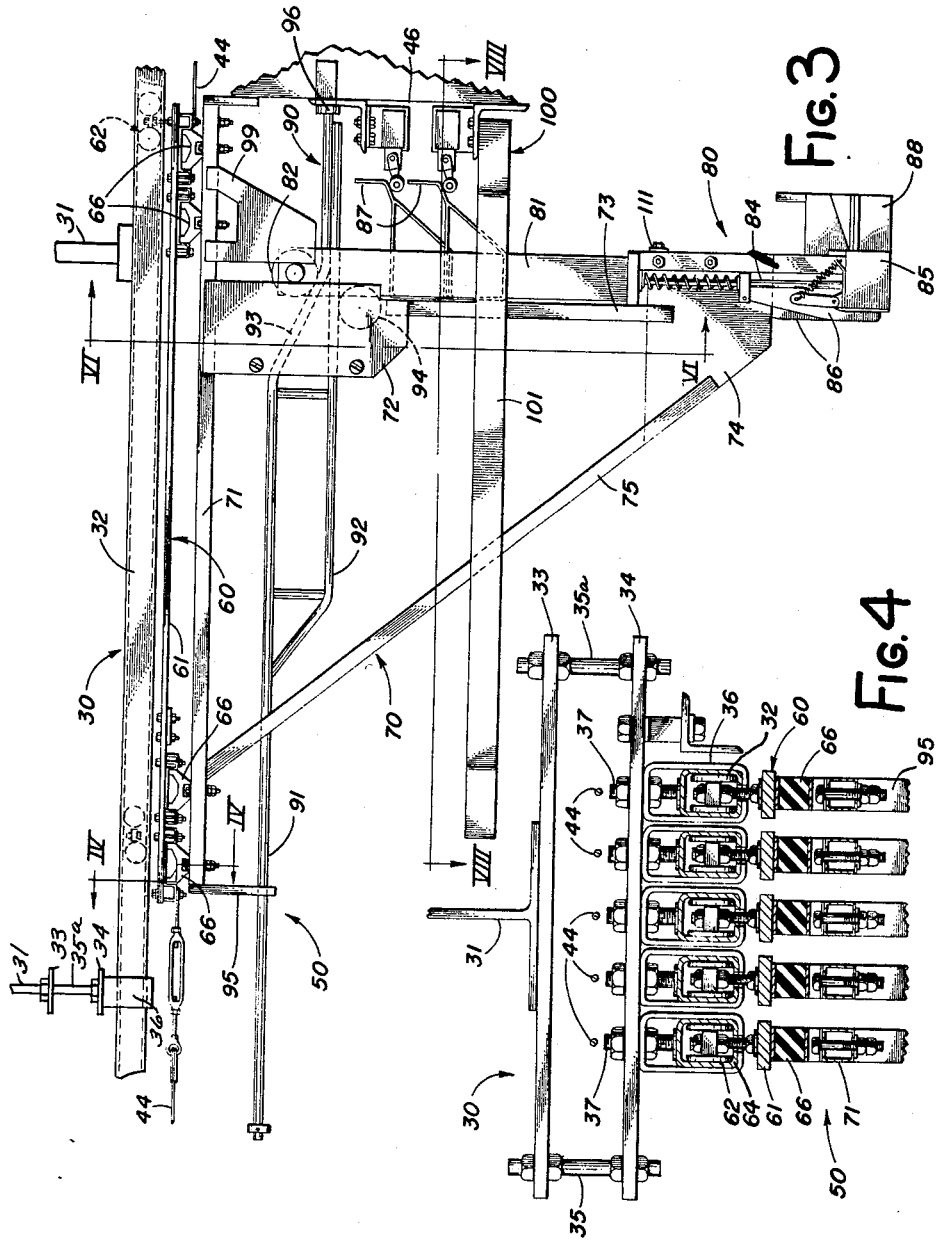

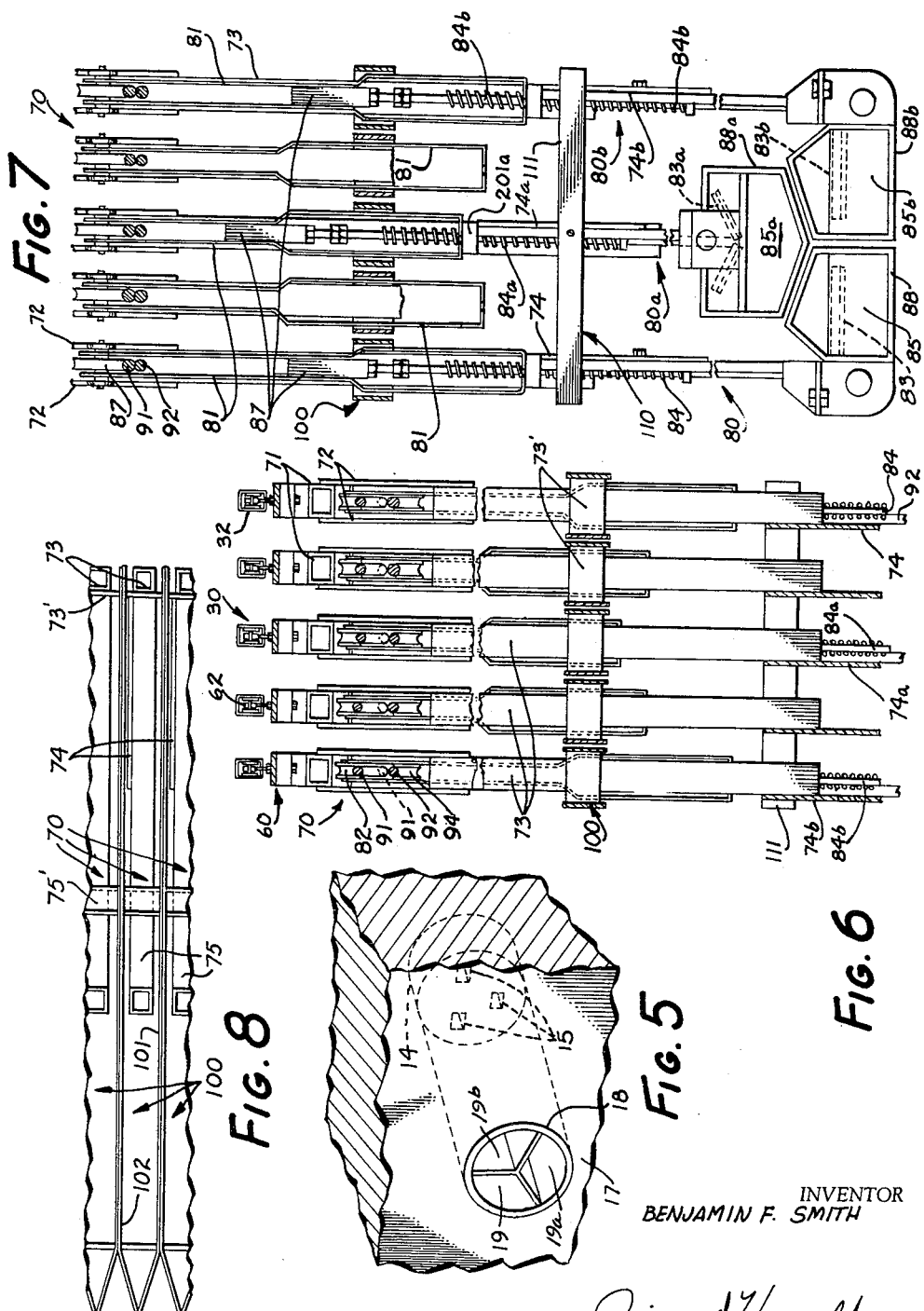

Oct. 16, 1962  B. F. SMITH  3,058,587
PULLER FOR EXTRUSION APPARATUS
Filed Sept. 23, 1959  4 Sheets-Sheet 4
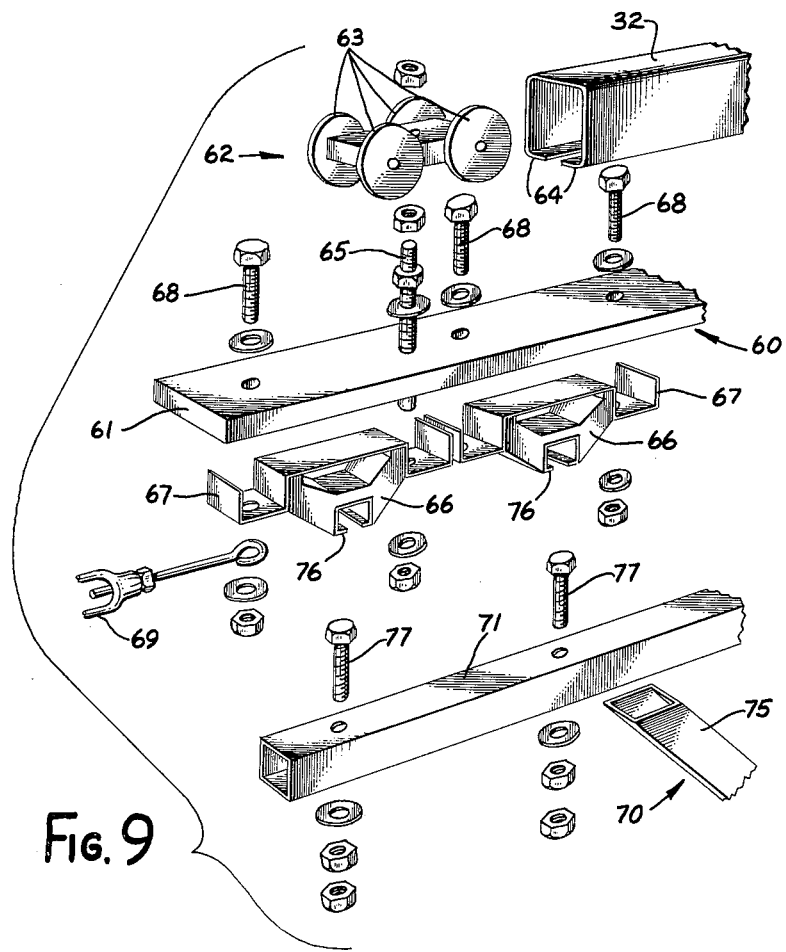
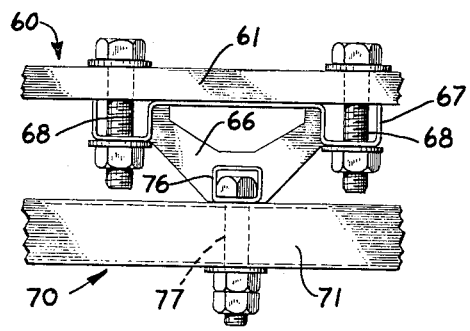
INVENTOR
BENJAMIN F. SMITH
BY
*Price and Henneld*
ATTORNEYS United States Patent Office 3,058,587
Patented Oct. 16, 1962

3,058,587
PULLER FOR EXTRUSION APPARATUS
Benjamin F. Smith, Grand Rapids, Mich., assignor to Light Metals Corporation, Grand Rapids, Mich., a corporation of Michigan
Filed Sept. 23, 1959, Ser. No. 841,716
1 Claim. (Cl. 207—1)

This invention relates generally to material handling apparatus, and more particularly to the use of material handling apparatus with and as a part of metal extruding equipment.

This application is a continuation-in-part of copending application Serial No. 634,014, filed January 14, 1957, entitled "Extrusion Puller," now abandoned.

Metal extruding processes require having a billet of the metal heated to a plastic or semi-plastic state. The billet is then placed in a container which is located in a press and disposed immediately behind an extrusion die. A hydraulic ram is disposed behind the billet to provide a continuous force which causes the material of the billet to flow through the extrusion die and assume the cross sectional shape of the die opening. The extruded member, or members, are of a length dependent upon the size of the billet and the size and number of openings in the extrusion die. In those instances in which members of considerable length are formed, it is conventional to provide a run-out table that extends for a considerable length from the press. Such tables support the extrusions as they are being formed, and are intended to afford free flow of the billet material as it passes through the openings of the extrusion die.

The material received through an extrusion die is in a pliable state and readily subject to deformation. Accordingly, it has long been a practice to provide workers to guide the material as it passes over the run-out table. The workers exert either no pulling force or a slight and steady force on the strip members as they are extruded and flow out over the run-out table. Their purpose is to prevent the extruded strips from buckling or touching other extruded strips and to direct the strips in a straight path. The highly pliable state of the extruded material causes the members formed to also be subject to deformation due to stretching.

The plastic or pliable state of extruded members, causing such care to be taken in running them out, has heretofore discouraged extruders from using mechanical handling means in place of the workers mentioned. However, the use of manual labor has its limitations also. When several extruded members of considerable length emerge from a single die, more than one or two workers may be required. Aside from the labor cost, the workers often get in each other's way in attempting to allow their extrusions to flow naturally and in keeping them in a straight and free flowing path.

This invention is directed to the basic problem of providing mechanical means of receiving different extruded strips as they are extruded from a die and to carrying and guiding such strips in independent yet coordinated relation over a run-out table without deformation thereof.

The material handling apparatus of this invention includes a plurality of overhead guide tracks extending between the extrusion press and a tower located beyond the end of the run-out table. Each track guides a separate trolley or carriage member to which is connected a frame that supports the work gripping means which receives one of the extruded work pieces as it is expelled from the extrusion press.

The gripper supporting frames of the trolley members are connected to the trolley members through vibration free and shock absorbing mounts. Accordingly, the work engaging grippers float substantially free of external disturbances as they pass over the run-out table, between the extrusion press and the guide track tower.

Therefore, the object of this invention is to provide a reasonably free floating support for the extrusion gripper means that receives and guides the extruded strips from an extrusion press. This aids in eliminating external influences which might adversely affect the formation of a straight, smooth, and true extrusion form.

These and other objects of this invention will be more apparent upon a reading of the following specification, in conjunction with the accompanying drawings wherein:

FIG. 1 is a side plan view of the extrusion handling apparatus of this invention;

FIG. 2 is an enlarged top elevational plan view of the extrusion handling apparatus of FIG. 1 looking in the direction of the arrows II—II along the planes represented by the lines between the arrows;

FIG. 3 is an enlarged side plan view of the trolley or carriage and work receiving support means, of the extrusion handling apparatus, shown at the right in FIG. 1;

FIG. 4 is a further enlarged cross sectional view of the trolley support means as seen in the plane of line IV—IV in FIG. 3 and looking in the direction of the arrows theron;

FIG. 5 is a partial, perspective view of the platen of the press showing the relationship of canister and die;

FIG. 6 is an end cross sectional view taken through the bank of work handling devices of FIG. 3 in the plane of line VI—VI thereof, and looking in the direction of the arrows;

FIG. 7 is an enlarged end view of the work handling devices of FIG. 3, as seen from the extrusion gripper receiving side of such devices;

FIG. 8 is an enlarged cross sectional view showing the canoe shaped bumper guards and guides as seen in the plane of line VIII—VIII of FIG. 3, looking in the direction of the arrows thereon;

FIG. 9 is an exploded view of the trolley or carriage and support frame assembly to provide the vibration and shock resistant extrusion handling apparatus of this invention;

FIG. 10 is an enlarged side plan view of the carriage and support frame mount as assembled.

Referring to the drawings in further detail:

In certain instances the same reference numeral is used to designate separate but identical parts when there are several of these identical parts spaced closely together. This arrangement clarifies the drawings since it avoids crowding a multiplicity of unnecessary reference numerals into a small area.

The metal extruding apparatus includes a press 10 within which the actual extruding operation is performed. A run-out table 20 is provided at the extrusion receiving side of the press 10. An overhead track arrangement 30 extends over the run-out table 20 between the press 10 and a tower 40 provided beyond the end of the run-out table. A plurality of extrusion handling devices generally 50 are supported on the overhead track arrangement 30. The extrusion handling devices 50 are adapted to travel from the press 10 toward the tower 40 and, in so doing, to guide extrusions received from the press out over the run-out table 20.

The extrusion press 10 includes a housing 11 having a cylindrical passage formed therethrough for receiving the billet of material 12, in any well-known manner, to be extruded and the press ram 13 which provides the extruding force. The housing 11 may receive the billet 12 in a pre-heated and semi-plastic state and/or may include resistant or other heating means to keep or bring the billet to such a pliable state. A die 14, having a given number of die openings generally 15, of a certain shape, is located within a support 16 immediately forward of the billet housing 11. The support 16 is usually movable relative to the billet housing 11 to enable the ready exchange of die forms having different extrusion forming openings.

An extrusion receiving housing 17 is located forward of the die 14. The housing 17 includes a canister passage within which is disposed an elongated cylindrical member 18 that is referred to as a canister and has a plurality of passages generally 19 formed therethrough. The passages 19 correspond in number to the die openings 15 of a particular die member and are intended to receive and direct the extruded work pieces through the receiving housing 17.

The run-out table 20 is disposed to receive extrusions passing from the press housing part 17. Accordingly, the height of the run-out table is substantially level with the lower edge of the canister passage through the housing 17. The table includes a flat platform-like surface 21 which extends for a considerable length from the press 10. It is desirable to have the run-out table sufficiently long to accommodate the extrusions from a single billet.

The overhead guide track arrangement 30 requires some form of overhead support. Such support may be derived from an overhead beam (not shown) depending from the building roof supports, or the like. Hanger members 31 attached to the beam are secured to the guide track 30 at spaced intervals along the length thereof, providing suspension for the guide track. The hanger members 31 are provided at spaced intervals as necessary to maintain the guide track members 32 straight. A pair of parallel spaced bars 33 and 34, separated by threaded bolt and lock nut means 35 and 35a are secured to the hanger members 31 and have guide track brackets 36 secured thereto. The guide tracks 32 are received through the brackets 36 and are held engaged within the brackets by the head end of the bolt means 37 that secures the brackets to the hanger bar 34.

The guide tracks 32 are of inverted channel shaped cross section with inbent flanges at their open side. A plurality of the guide tracks 32 are secured to the overhead hangers in close parallel relation to afford distinctly separate tracks for different extrusion handling devices 50. The number of tracks 32 and devices 50 in use depends upon the number of work pieces that are to be extruded at the same time, as will be shown.

The drive means for the extrusion handling devices 50, as they travel on the guide tracks 32, includes separate drive motors 41, 41a, 41b, 41c, and 41d mounted within the tower 40. The drive motors 41, 41a, 41b, 41c, and 41d each include a pulley 42, 42a, 42b, 42c, 42d, respectively, which drives one of a plurality of axially aligned pulleys 43 upon which endless wire cables 44 travel. The cables 44 pass over return pulleys 45 provided in a housing 46 on top of the press 10. The ends of the cables 44 are connected to opposite ends of the different extrusion handling devices 50.

The extrusion handling devices 50 each include a carriage or trolley portion generally 60 having a support frame generally 70 engaged thereto. Five such handling devices 50 each with a support frame are provided as shown by FIGS. 4 and 6. Any number of these can be used. We show work piece gripping mechanisms 80, 80a, 80b, 80c, and 80d mounted one on each of the support frames 70. However, only gripping mechanisms 80, 80a, and 80b actually are complete since a three hole arrangement is illustrated, it being understood that all five gripper mechanisms can be made complete by attaching gripper housings, clamps, etc., to the shown parts of mechanisms 80c and 80d. A gripper resetting mechanism 90 is provided within each of the support frames 70 and each frame also includes its own bumper guard and guide means 100, as will be described.

The carriage or trolley 60 of the extrusion handling devices 50 include an elongated bar 61 having a tracking member 62 mounted at each end thereof, best shown in FIGS. 9 and 10. The tracking members 62 include roller wheels 63 received within the guide tracks 32 and riding on the inbent track flanges 64 thereof. The carriage bars 61 hang in parallel spaced relation below the tracks 32 on the hanger bolts 65 which secure the tracking members 62 thereto.

The support frames 70 are secured to the trolley or carriage members 60 by means of support blocks 66 bonded within support brackets 67. The support blocks 66 are of a durable resilient material formed to a general U shape and provided a relatively vibration-free, shock resistant and free hanging support of the frames 70 to the trolleys 60. The support brackets 67 include a recessed area within which the legs of the support blocks are received. The ends of the brackets are secured by bolt and nut means 68 to the carriage bar 61. The hanger bolt 65 may serve as one such bracket retaining means.

A turnbuckle coupling 69, for one of the drive cables 44, is secured to the trolley member 60 by means of one of the bolt fasteners 68.

The support frames 70 comprise a horizontal support or frame member 71 of tubular cross section for greater strength, having guide plates 72 secured on opposite sides and near one end thereof. A depending frame member 73 connects a lower disposed angle bracket plate 74 to the guide plates 72. The lower plate member 74 serves as an angle bracket to receive a diagonal brace 75 secured to the forward end of the horizontal support 71.

The support frames 70 are secured to the carriages or trolleys 60 through the resilient support blocks 66. A slotted coupling member 76 is bonded within the depending web of the U shaped support blocks 66 to receive the heads of bolt means 77 engaged with the frame member 71 (FIG. 10).

As best shown in FIG. 3, a plurality of the vibration and shock resistant support mounts 66 may be used. In the illustrated structure two such mounts are provided at each end of the support frames 70.

The gripper devices 80, 80a and 80b are best described in the co-pending application entitled "Automatic Extrusion Gripper Assembly," filed September 23, 1959 and assigned Serial No. 841,801. In brief, such devices include a housing bracket 81 disposed adjacent and in spaced relation to the depending frame member 73. The housing bracket 81 has a guide roller 82 mounted at its upper end. The guide roller 82 rides on the gripper resetting device 90 and is caused to rise and fall within a guide slot track provided by the guide plates 72 and another guide plate member 99 secured to the frame member 72 next adjacent thereto. Within the hanging brackets 81, and extending therebelow, are spring loaded actuating rods 84. The actuating rods 84 have the clamping jaws 83, 83a and 83b of the gripper mechanism connected to their lower end.

The work piece receiving members 85 of the gripper mechanism are mounted on the angle bracket plates 74 at the lowermost end of the support frame. A trap door arrangement 86 is provided at one end of each of the work receiving members 85. When work pieces are received within members 85, and engage the door devices 86, the spring loaded rods 84 are immediately triggered into service. The rods motivate the clamping jaws mentioned to engage and hold the work pieces to and within the receiving members 85. A drive motor switch actuating member 87 is provided on the upper end of each of the jaw controlling rods 84. Accordingly, when the rods 84 are triggered into action and the associated drive motor is activated, then the extrusion handling devices 50 are immediately placed in operation.

Guide funnel members 88 are shown in combination with the work receiving members 85 in this installation. Such funnel members 88 serve to guide the extruded work pieces from the passages of the canister 18 into the different extrusion handling devices 50. The use of such funnel members 88 is more fully described in the co-pending application Serial No. 841,720 filed September 23, 1959, and entitled "Extrusion Puller Equipment."

The resetting mechanism 90 is also more fully disclosed in the last mentioned co-pending application. In brief, such mechanism includes a pair of horizontally reciprocal rods 91 and 92 connected together in a manner that provides a cam shoulder 93 to raise the guide roller 82 within the guide slot track between plates 72 and 99. The rods 91 and 92 are supported at one end by a roller 94 mounted between the guide plates 72. The other end of the rod assembly is supported within a guide hanger 95 provided on the support frame 70. The die end of the rod assembly is formed and disposed to engage a stop 96 to effect a resetting of itself. The other end of the rod assembly is formed and disposed to engage a hanging stop 97 provided on the overhead track 30 near the far end thereof. The stop 97 also supports a switch 98 which reverses the drive direction of one of the drive motors 41, 41a, 41b, 41c, or 41d when the rod guiding bracket 95 comes in contact therewith.

The canoe shaped bumper guards and guiding members 100 are supported on the support frames 70 of the extrusion handling devices 50, by support members 73' and 75' (FIG. 8) at a level between the carriage or trolley members 60 and the work receiving ends of the gripper mechanisms 80. Such guide members extend substantially the length of the frame member 71 and are disposed in fixed parallel spaced relation therebelow. The bumper guards include separate bumper side members 101 and 102 having their ends converging together. The guards 100 of each extrusion handling device 50 are in substantially a co-planar relationship to the guard of the next adjacent such device. Further, the added width afforded the devices 50, due to the bumper side members 101 and 102 extending on each side thereof, is complementary to the spacing of the guide tracks 32.

The length of the guards 100 enables them to serve as guides with respect to each other. If one of the extrusion handling devices lags or advances beyond the next adjacent such device there is still considerable overlapping guide surface between them.

The canoe shaped members 100 also guide each extrusion handling device 50 into its proper nested relation relative to the press 10, and in position to receive a work piece from the extrusion die.

As shown by FIGS. 6 and 7, the gripping devices 80, 80a and 80b may be disposed at different heights by having a longer or shorter hanging bracket 81. The work receiving members 85 of the gripper device may be connected below or off-center from the angle bracket plate 74 which supports it. Thus, as in the assembly shown, a compact arrangement of the work receiving members 85 (and their funnel parts 88) may be provided for an extrusion die having any number of die openings.

In receiving work from the press 10, it is important that the receiving heads 85, and their funnels 88 when a part thereof, be properly oriented with respect to each other and to the passages 19 of the canister 18 within the press. The guards 100 afford lateral spacing of the work receiving heads 85 and their vertical disposition is previously set by the length of their hanger brackets 81. However, since each unit is a separate carrier, means must be provided to coordinate their nesting together at the press opening. This is accomplished by a stationary guide 47 extended out beyond the housing 46 on top of the extrusion press. The inner sides of said guide 47 converge together toward the press and the guide is disposed at the level of the canoe shaped bumper guards 100. Thus, the extrusion handling devices 50 are directed together and in nested relation at the press. The additional guide means 47a assist in assuring that the handling devices 50 are in a nested position at the press.

Since the extrusion handling devices 50 travel at different and independent rates in drawing the extruded work pieces out over the work table 20, they would not normally be collected together on their return.

To coordinate the return of the handling devices 50, a retarder gate 110 is provided as shown by FIG. 6. The retarder gate is a pivotal bar 111 mounted on one of the handling devices 50 and adapted to assume either a non-interfering vertical position or an overlapping horizontal relation to the other handling devices. This is best shown in FIG. 6. Automatic or manual means may be used to dispose the bar 111 in a horizontal position at the start of, or at some determinative position during, its return travel. The handling device which includes the retarder gate is set to have a slower return rate than the other devices. Accordingly, the other devices will come into alignment with the slower device during the return travel and all will be aligned upon approaching the extrusion press 10.

OPERATION

The specific electrical controls for the invention are not an important aspect of this application. Therefore, no illustration or detailed explanation is considered necessary. However, for a complete description of such controls and their interrelation with other mechanism mentioned, reference should be made to the co-pending application Serial No. 841,800, filed September 23, 1959, and entitled "Method and Control Apparatus for Pulling Extrusions From Dies."

The number of work handling devices 50 to be used for an extrusion operation is dependent upon the die form 14 that is used. A separate work handling device is to be used for each opening in the die 14. Other handling devices are preferably coupled to one of the operative devices and ride along therewith. However, the gripper mechanisms 80, 80a and 80b are removed from the inoperative devices.

The work handling devices 50 are mounted on the guide track arrangement 30, in the manner mentioned. The selected die 14 is mounted in the support 16. The proper canister 18, with the required passages for the selected die, is mounted in the housing 17 forward of the die. The press is thereafter placed in operation and the press ram acts against the end of the billet to cause the extrusion of metal through the die.

The extruded work pieces are received through the canister passages 18, from the die, and are directed toward the run-out table 20. The funnel members 88 are aligned with the open ends of the canister passages and direct the extrusions into the respective work receiving heads 85 of the different work handling devices 50. When an extruded piece engages the trap door 86 the clamping mechanism is triggered into operation. As the actuating rods 84 drop under spring pressure, the drive motor switch actuating members 87 signal the drive motors to commence operation.

The handling devices 50 travel at a moderate rate dictated by the flow of metal through the extrusion die 14. Only very slight pulling pressure is applied. During the run-out operation over table 20, the shock mounts 66 afford substantially complete vibration and shock isolation between the work carrying or supporting frames 70 and the trolleys 60. This is important in many instances because relative movement between the gripper frame and trolley is transmitted to the pliable strip being extruded resulting in an irregular shaped strip. The shock mounts minimize this relative movement and the resultant irregularity in the strips. The bumper guards 100 keep the handling devices 50 laterally spaced and are of reasonably sufficient length to maintain such lateral spacing despite the lead or lag of one device relative to another.

As the handling devices 50 approach the end of their travel, the gripper resetting mechanism 90 engages the stop 97 near the end of the track system 30. The interconnected rods 91 and 92 are stopped and the support frames 70 and gripper devices 80, 80a and 80b overrun the resetting mechanism 90. Support frame 70 and the gripper devices 80, 80a and 80b are released from engagement with the work and are reset by guide rollers 82 actuated by cam surfaces 93 for subsequent operation. Continued travel of the work devices 50 causes the hanging support brackets 95 of the reset mechanisms 90, at the forward end thereof, to engage the drive motor control switches 98. The switches 98 effect a reversal of the direction of drive within the drive motors 41, 41a, 41b, 41c and 41d so that the handling devices 50 are readied for their return travel to the die 10.

After the extruded work pieces are removed from the work receiving members 85, as by removal through an open side thereof or other means, the handling devices 85 are ready to be returned to the press 10. The return travel is much more rapid than the forward travel. However, as mentioned, one of the drive motors 41, 41a, 41b, 41c or 41d is set to return its handling device 50 slower than the others. It is this handling device which includes the retarder gate 110. The retarder gate 110 in its horizontal position, keeps all of the handling devices laterally aligned so that they approach the press 10 together. The bumper guards 100 again serve to maintain the proper relative lateral spacing of the handling devices. They also serve to prevent them from weaving in and out during their relatively rapid return stroke.

As the handling devices 50 approach the press 10, the reset mechanisms 90 are reset for operation by engagement with the stops 96. The switch actuators 87 for the drive motors 41, 41a, 41b, 41c and 41d on the gripper jaw control rods 84, have been previously repositioned in reloading the gripper mechanisms 80, 80a and 80b. Accordingly, they are in position to inactivate the respective drive motors 41, 41a, 41b, 41c and 41d when the handling devices 50 are back in their starting positions.

The different handling devices 50 are further assured of being properly positioned, upon their return, by the stationary guide 47 and guide means 47a. The convergent ends of the outermost guards 100 of the handling devices cooperate with the fixed guide 47 and guide means 47a to cause each of the handling devices to nest properly at the extrusion receiving end of press 10 ready for another run.

While a preferred embodiment of this invention has been described, it will be understood that other modifications and improvements may be made thereto. Such of these modifications and improvements as incorporate the principles of this invention are to be considered as included in the hereinafter appended claims unless these claims by their language expressly state otherwise.

I claim:
An underslung load carrying vehicle comprising: a carriage which includes a support frame, said carriage being adapted to hold the load which is to be moved; at least two support brackets positioned above the upper surface of said support frame and respectively located near the front and rear thereof, each support bracket having a cavity therein with the cavity opening facing said upper surface; U shaped support blocks of a durable resilient material, said blocks corresponding in number to the number of support brackets employed, each U leg of each support block being bonded to the bottom of and a respective side of a respective said cavity with the block portion connecting the U legs free of said bottom, said block portion in turn having a recess on the side away from said bottom and with the recess opening facing said upper surface; slotted coupling members corresponding in number to the number of said support blocks employed, each coupling member being bonded to the sides and bottom of a respective said recess with the slotted opening in said coupling member facing said upper surface; headed bolts corresponding in number to the number of said coupling members employed, each said bolt being attached to said support frame and projecting so that the bolt head engages inturned edges of said slotted opening thus supporting said carriage from said support brackets; two four wheeled trucks adapted to ride two parallel tracks; respective connections attaching said support bracket to an underside of a respective truck so that said connections depend between said tracks and said carriage is resiliently supported by said trucks at a location therebelow.

References Cited in the file of this patent
UNITED STATES PATENTS

| | | |
|---|---|---|
| 415,617 | Cody | Nov. 19, 1889 |
| 504,591 | Kees | Sept. 5, 1893 |
| 898,262 | Renken | Sept. 8, 1908 |
| 956,157 | Parmley | Apr. 26, 1910 |
| 1,422,394 | Wagner | July 11, 1922 |
| 1,959,172 | McIlrath | May 15, 1934 |
| 2,060,402 | Strauss | Nov. 10, 1936 |
| 2,367,793 | McIlvried et al. | Jan. 23, 1945 |
| 2,753,588 | Gross | July 10, 1956 |
| 2,893,552 | Davies | July 7, 1959 |
| 2,914,170 | Kent | Nov. 24, 1959 |

FOREIGN PATENTS

| | | |
|---|---|---|
| 6,612 | Great Britain | 1898 |
| 878,626 | Germany | June 5, 1953 |